Figure 1:
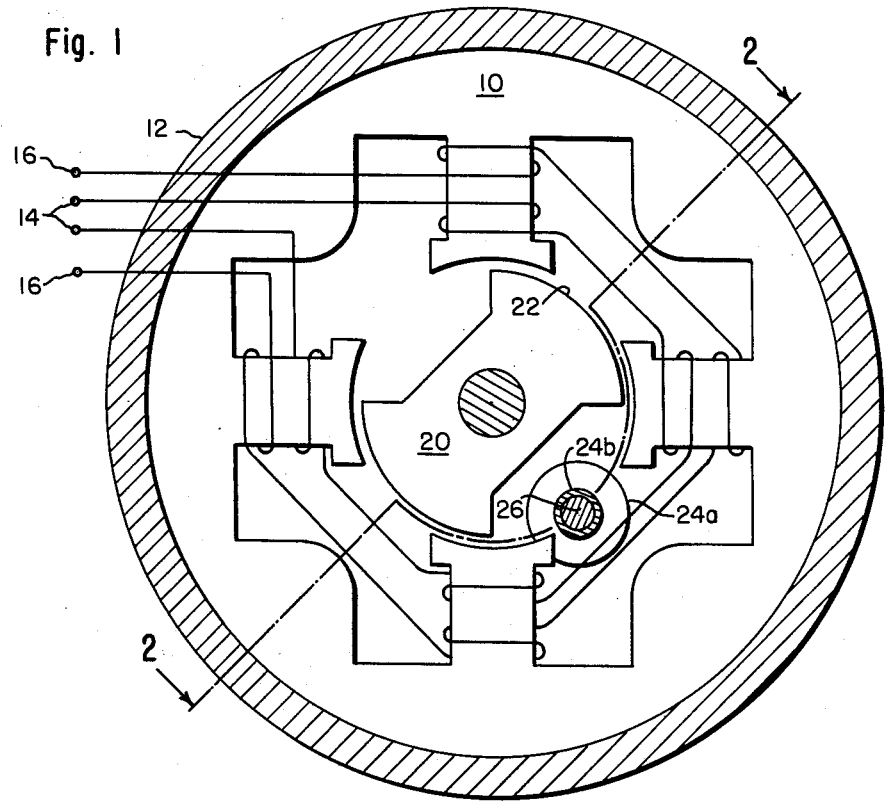

May 1, 1962 E. L. SWAINSON 3,032,730
NULL SHIFTING DEVICE FOR MICROSYN
Filed Aug. 11, 1958

INVENTOR.
EDWARD L. SWAINSON
BY
ATTORNEYS

United States Patent Office 3,032,730
Patented May 1, 1962

3,032,730
NULL SHIFTING DEVICE FOR MICROSYN
Edward L. Swainson, Newtonville, Mass., assignor, by mesne assignments, to Northrop Corporation, Beverly Hills, Calif., a corporation of California
Filed Aug. 11, 1958, Ser. No. 754,403
5 Claims. (Cl. 336—134)

This invention relates in general to variable dynamo transformers and in particular, to such transformers which are hermetically sealed in containers.

The theory of operation of variable dynamo transformers or microsyns as they are sometimes called is disclosed in United States Patent No. 2,488,734 to Mueller. Structural details of several types of microsyns or variable dynamo transformers are also disclosed in that patent. Although the disclosure of the patent is limited to a dynamo transformer wherein the stator has but two pairs of magnetic poles, the present invention is applicable not only to structures of that type but also to structures wherein many pairs of poles comprise the stator.

The rotor of the dynamo transformer is provided with circular end portions and the length of the arc of each circular end portion is equal to the distance between the centers of two adjacent poles of the stator. The rotor is provided with as many such circular end portions as there are pairs of poles in the stator. In other words, in the simple four-pole stator structure such as disclosed in the cited Mueller patent, a rotor having two circular end portions would be used. The same ratio would hold true for dynamo transformers having larger numbers of pairs of poles in the stator.

In the electrical portion of the dynamo transformer, various coil connections and configurations are used about the poles of the stator. In any event, in every case, at least a coil is formed about each pole piece of the stator. As is explained in the Mueller patent, however, depending upon the use to which the device is to be put, there exist devices having different numbers of coils and different connections between coils.

In many applications it is necessary or desirable to incorporate the dynamo transformer in a hermetically sealed container. In those devices which include primary and secondary coils wound on the pole pieces of the stator, an electrical null position exists. By this is meant that if a signal is placed on the input winding there should be an output approaching zero at some physical position of the rotor relative to the stator. The null or zero output position physically is the position where the edges of the circular portions of the rotor are exactly at the centers of the pole faces of the stator. Because of variations in the manufacture of components, it has been found that the zero electrical position of the rotor does not always coincide with the zero physical position of the rotor defined above. The lack of coincidence of the physical and electrical null positions causes a great deal of difficulty in calibrating any device of which the dynamo transformer is a part. This difficulty is only aggravated in the situation where the dynamo transformer is enclosed in a hermetically sealed container.

In other instances, it is desired to produce an electrical null at a particular rotor position which may not be the mechanical or physical central position of the rotor. At present, no existing device for achieving this result simply and inexpensively is known.

It is, therefore, a primary object of the present invention to bring into coincidence, the electrical and mechanical null positions of a variable dynamo transformer hermetically sealed in a container.

It is a further object of the present invention to eliminate errors and calibration difficulties in the adjustment of dynamo transformers.

It is a further object of the present invention to provide variable dynamo transformers which have uniformly equal outputs at the null position.

Figure 2:
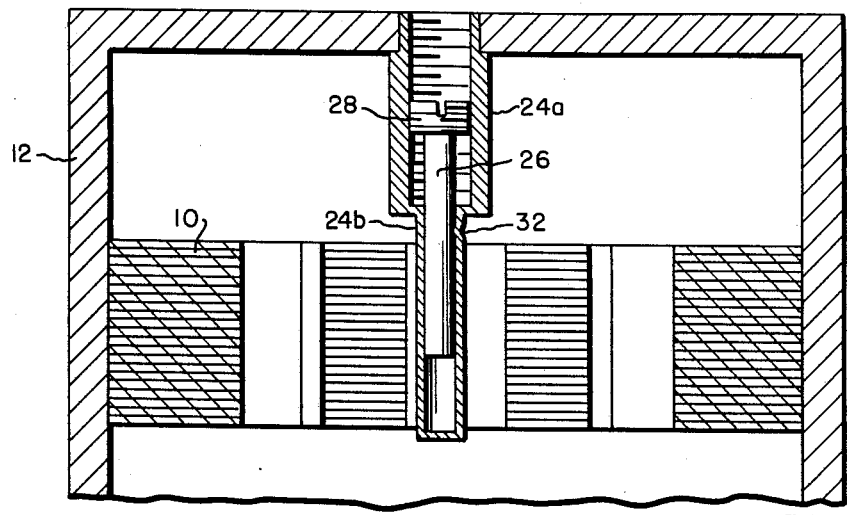

In general, the present invention consists in a compensating mechanism disposed in a non-magnetic tube which is sealed into a case which hermetically encloses a dynamo transformer. Mounted in the tube is a piece of magnetic material such as soft iron adjustable in its position adjacent to a stator pole face of the dynamo transformer. Variation of the position of the magnetic member alters the leakage flux path of the dynamo transformer. The effect of the altering of the leakage flux path is to offset the null position of the rotor relative to the stator. In other words, by adjustment of the magnetic member, the electrical output of the device may be reduced to null at any one of a limited number of physical positions of the rotor relative to the stator. In a preferred embodiment of the invention, the magnetic member is constituted by a soft iron rod attached to a screw which is threaded into the non-magnetic tube sealed into the hermetically enclosing container. The tube includes locking means for locking the magnetic member in its adjusted position. For a better understanding of the present invention, together with other and further objects, features and advantages, reference should be made to the following detailed description of a preferred embodiment thereof which should be read in connection with the accompanying drawing in which:

FIG. 1 is a view looking upward from beneath the rotor and stator and the flux shifting device of a microsyn, and FIG. 2 is a sectional elevation of the embodiment of the invention shown in FIG. 1 taken along the line 2—2.

The device shown in FIG. 1 includes a stator 10 preferably made of laminations of magnetic material. The stator is annular in shape and is rigidly fixed to the inner wall of a case or container 12. It is shown as having four re-entrant poles, but, this is for simplicity of explanation only. Any reasonable number of pairs of poles could be used; in some instances more pairs of poles would be advantageous.

A dynamo transformer may be provided with any of numerous combinations and configurations of windings depending upon the use or application to which it is to be put. The illustrated transformer is shown as having only a primary winding 14 and a secondary winding 16 schematically indicated.

In many instances, the rotor is provided with faces contoured to shapes which are not true radii from the center of rotation. Similarly, although less often done, the stator pole faces may not be formed as cylindrical sections. However, for ease of understanding and clarity, in the embodiment shown, the innermost surfaces of the stator poles or teeth are shaped arcuately on a common center, the radius of the arc being slightly greater than that of a rotor 20 which is disposed centrally within the stator. The rotor is pivoted or journaled in suitable bearings about an axis which is also on the common center of the stator frame. The rotor is also made of magnetic material such as laminated soft iron but carries no windings. It is provided with similar peripheral circular end portions of which portion 22 is typical. It will be noted that the arcuate length of the portion 22 is sufficient to span the distance between the centers of adjacent stator teeth. The radius of the peripheral arcuate rotor portions is sufficiently less than that of the inner arcuate tooth surfaces of the stator to provide an accurately uniform air gap between rotor and stator in very position of the rotor of the illustrated embodiment. The normal or neutral position of the rotor is with its edges at the centers of the pole faces as shown in FIG. 1. In some instances, as noted above, where special contours are used on rotor or stator, the gap would not, of course, be uniform.

Sealed into the top of the case is a tube made of non-magnetic material. The tube projects between two of the stator pole teeth and is constructed in two sections 24a and 24b. Although, for facilitating its fabrication the tube is of non-magnetic material, only that portion which lies adjacent the stator need be made of non-magnetic material. The section 24b of the tube is of lesser diameter than the section 24a and contains a closely fitted soft iron rod 26. The soft iron rod 26 is attached to a set screw 28 which engages threads on the inner surface of the larger section 25a of the sleeve. The top of the screw 28 is slotted to permit its adjustment by means of a screw driver. The tube section 24b is indented or bent as shown at the point 32. The indentation in the tube presses against the rod 26, and holds the rod in any given position in which the rod is set. Numerous equivalent locking devices may be substituted for the indentation illustrated and described. For example, the rod 26 itself might be bent slightly, the tube 24b might be bent, or locking members associated with the screw 28 could be utilized.

A considerable discussion of the theory of operation and the application of microsyns is given in the above-cited Mueller Patent No. 2,488,734. For purposes of explanation of the present invention repetition of only a brief portion of that theory is needed. The mutual inductance between windings on the reentrant poles changes with displacement from the neutral position of the rotor. The design of the dynamo transformer is such that the mutual flux linkages and hence, the mutual inductance between windings are proportional to the angle of displacement of the rotor. This is the ideal condition where all elements of the structure are symmetrical and when the tolerances of all components are substantially perfectly observed. However, as noted above, this is not usually the case in a practical device. Means are usually required to alter the flux path slightly to provide a null electrical position when the edges of the arcuate sections of the rotor are in alignment with the centers of the poles of the stator.

In the specific example of the present invention here described, the flux path is altered by turning the screw 28 to adjust the depth of penetration of the soft iron rod 26 into the space between the stator teeth. In practice, in a device having primary and secondary windings, such as a pick-off, the rotor is set in the normal neutral physical position relative to the stator and the screw 28 is advanced or retracted until a null or zero output is obtained.

In the converse situation where it is desired to produce an electrical null at some rotor position other than the mechanically central position, use of the invention is quite similar. The rotor is simply left at the mechanical position which it assumes and the depth of penetration of the rod is adjusted until a null electrical output is obtained.

By virtue of the enclosure of the rod of magnetic material in a tube sealed into the container, adjustment of a hermetically sealed device is possible. Other types of magnetic material, and other mechanisms for changing the physical position of the compensating member may be used without departing from the concepts of the present invention. The invention should be limited only by the spirit and scope of the appended claims.

What is claimed is:

1. In a variable dynamo transformer having a stator comprised of at least two pairs of magnetic poles, a rotor mounted within said stator, and electrical coils wound on said poles, null shifting apparatus comprising a case surrounding at least said dynamo transformer and having an opening formed therein, a tube sealed in said opening and extending adjacent one of said poles, a member composed of magnetic material disposed adjacent one of said poles and means for adjusting the position of said member to alter the flux pattern within said transformer.

2. In a variable dynamo transformer having a stator comprised of at least two pairs of magnetic poles, a rotor mounted within said stator, and electrical coils wound on said poles, null shifting apparatus comprising a case hermetically enclosing at least said dynamo transformer and having an opening formed therein, a reentrant tube sealed in said case adjacent a pole of said stator, said tube having an open outer end and a closed inner end, a screw threaded in said tube, and a rod of magnetic material attached to said screw, said screw being formed to receive a tool to permit rotation thereof to advance and retract said rod to alter the flux pattern within said transformer.

3. A variable dynamo transformer as defined in claim 2 including a casing surrounding said transformer, a tube open at one end, the rim of said open end being attached and hermetically sealed to said casing, the other end of said tube being closed and extending between said poles, at least the portion of said tube adjacent said poles being made of non-magnetic material, the inner walls of said tube being threaded, a screw threaded in said tube and attached at its inner end to said magnetic member, whereby said magnetic member may be raised or lowered within the tube by rotating said screw head.

4. In a variable dynamo transformer having a multi-pole stator, windings disposed upon the poles of said stator, a rotor mounted for limited rotation relative to said stator, and a hermetically sealed case surrounding said transformer, a tube sealed in an opening formed in said case, said tube having an open outer end and a closed inner end and projecting between poles of said stator, at least the portion of said tube adjacent said stator poles being made of non-magnetic material, a rod of magnetic material disposed within said tube, and a screw threaded into said tube and attached at its lower end to an end of said rod, said tube having an indentation formed therein in frictional contact with said rod, whereby rotation of said screw adjusts the position of said rod relative to said stator to alter the flux path within said transformer.

5. In a variable dynamo transformer having a stator which includes at least two pairs of magnetic poles, a rotor mounted for limited rotation within said stator and electrical coils wound on said poles, null shifting apparatus comprising a substantially cylindrical case coaxial with and hermetically enclosing said variable dynamo transformer, said case having an opening formed therein at an end thereof and displaced from the axis thereof, a stepped reentrant tube sealed in said opening and extending into said case along a line adjacent one of said poles, said tube being formed of non-magnetic material and having a closed inner end and an open outer end, a screw threaded in the stepped section of said tube adjacent said outer end thereof, a rod of magnetic material attached to said screw and disposed within the stepped section of said tube adjacent the inner end thereof, the upper surface of said screw being formed to receive a tool whereby said screw may be rotated to advance or retract said rod to alter the flux pattern of said dynamo transformer.

References Cited in the file of this patent

UNITED STATES PATENTS

| | | |
|---|---|---|
| 2,461,397 | Ross | Feb. 8, 1949 |
| 2,482,902 | Clark | Sept. 27, 1949 |
| 2,488,734 | Mueller | Nov. 22, 1949 |
| 2,668,947 | Stewart | Feb. 9, 1954 |
| 2,758,288 | Shannon | Aug. 7, 1956 |